United States Patent Office 3,466,223
Patented Sept. 9, 1969

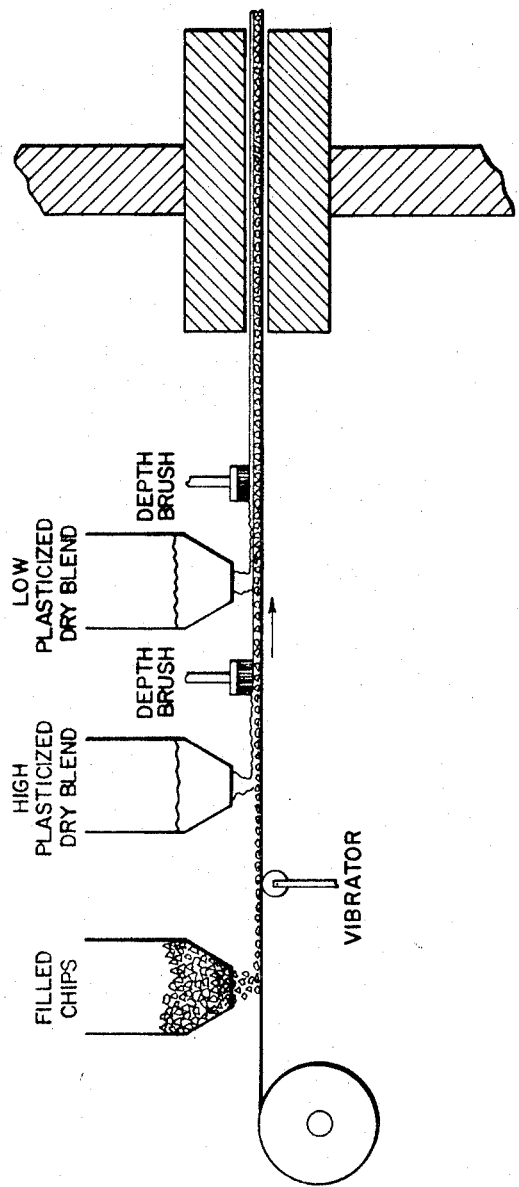

3,466,223
PLASTICIZED VINYL RESIN COMPOSITIONS CONTAINING 2,2,4 - TRIMETHYLPENTANE-1,3-DIOL DIISOBUTYRATE
Albert D. Beeler and Marvin R. Whitley, Kingsport, Tenn., assignors to Eastman Kodak Company, Rochester, N.Y., a corporation of New Jersey
Filed June 1, 1964, Ser. No. 371,794
Int. Cl. B32b 5/16, 27/30; C07c 69/28
U.S. Cl. 161—162        3 Claims

ABSTRACT OF THE DISCLOSURE

Highly stain-resistant and flexible surface coverings such as floor tile are prepared from resinous compositions having a thin surface coating of vinyl chloride resin containing 8–13 phr. of 2,2,4-trimethylpentane-1,3-diol diisobutyrate.

---

This invention relates to plastic compositions and more particularly to vinyl resin compositions having a stain-resistant topcoat.

Vinyl resins conventionally include a plasticizer in an amount of from 25 to 60 parts by weight per hundred parts of resins (abbreviated hereinafter as "phr."). The plasticizer makes the normally brittle resin flexible and lessens the chance of cracking of the resin. The conventional plasticizers for this use are relatively high boiling liquid esters of which bis(2-ethylhexyl)phthalate (also known as dioctyl phthalate or "DOP") is the most widely used. An unfortunate drawback of the conventional vinyl plasticizers such as DOP, glycol diesters of benzoic acid and diesters of adipic acid is that they cause the resin to become much more susceptible to staining than the unplasticized resin. This has been an especially serious problem with poly-vinyl chloride) floor tiles. In addition to a plasticizer, the vinyl compositions used as floor tiles contain an inorganic filler which further adds to the staining tendency of the plasticized poly(vinyl chloride).

In accordance with the present invention we have now developed novel vinyl resin compositions, and particularly floor tile compositions that are exceptionally resistant to common household stains. The compositions of the invention comprise a relatively thick layer of plasticized vinyl chloride polymer having thereon a relatively thin coating of vinyl chloride polymer containing from 8 to 13 phr. of 2,2,4-trimethylpentane-1,3-diol diisobutyrate. A particularly valuable embodiment comprises a layer of filled vinyl resin chips embedded in a layer of clear plasticized vinyl resin and having a thin surface coating of vinyl chloride resin containing 8 to 13 phr. of 2,2,4-trimethylpetane-1,3-diol diisobutyrate. The invention also includes a novel method of preparing such compositions which comprise forming a layer of filled vinyl resin chips, forming a layer of a dry blend of plasticized vinyl resin in contact with the layer of highly filled chips, forming in contact with the latter layer a relatively thin dry blend layer comprising a vinyl chloride resin with from 8 to 13 phr. of 2,2,4-trimethylpentane-1,3-diol diisobutyrate, and fusing the dry blends by means of a heated press at a temperature below the fusion point of the filled chips.

We have discovered that the coated vinyl resin compositions prepared in accordance with the invention are sufficiently flexible but exhibit excellent stain resistance. The invention is thus based on our discovery that 2,2,4-trimethylpentane-1,3-diol diisobutyrate (referred to hereinafter as TMPD-DI) when used in exceptionally low concentrations (8–13 phr.) can impart the necessary flexibility to a thin vinyl coating without substantially increasing its susceptibility to staining. As a consequence the thin vinyl coating containing the low concentration of TMPD-DI can be formed on resin compositions such as floor tile compositions which are plasticized with conventional amounts of plasticizer to make them adequately flexible. The thin topcoat then protects the relatively thicker layer against staining without substantially reducing the flexibility of the overall composition. Furthermore, in many uses the relatively hard thin coating improves the wearing qualities of the vinyl composition.

When we refer to "filled" vinyl resin we mean such compositions containing an inorganic filler such as clay or calcium carbonate. The filler can comprise for example, from 150 to 275 parts by weight per 100 parts of resin. Compositions containing a very high concentration of filler, e.g., 200 to 275 phr. are referred to as "highly filled" vinyl resins. The filled resin compositions can be compounded wtih conventional equipment of the heated roll or internal mixer types which work the different ingredients such as filler, plasticizer, stabilizer and pigment, into the resin so they are uniformly dispersed. The resulting composition is then molded, calendered, extruded, cast or otherwise formed into articles of the desired shape.

A popular type of vinyl tile composition consists of a layer of small chips or squares of highly filled vinyl resin embedded in a layer of clear vinyl resin, plasticized with 25 to 60 phr. of a vinyl plasticizer such as DOP. The present invention is particularly valuable in providing floor tile compositions of this type that are resistant to staining by common household stains.

In order to more fully describe the invention reference is made to the drawing which shows a sketch of one embodiment of the process of this invention.

Following is a general procedure for preparing novel tile compositions in accordance with the invention as shown in the sketch:

(1) Highly filled vinyl chips are prepared by compounding the resin and filler and other desired ingredients on a two-roll mill, calendering, and thereafter granulating or cutting the compounded sheets into chips or squares.

(2) Powered vinyl resin, 25 to 60 phr. of plasticizer and 3 to 5 phr. of stabilizer are dry blended in a suitable mixer such as a Henschel mixer or Ribbon blender while heating below the fusion temperature of the resin, e.g., at 170 to 180° F. The product resulting from this continued mixing at a temperature below the fusion temperature of the resin is a dry, free flowing, powdery mixture, commonly called a "dry blender."

(3 The dry blend of step (2) is spread over the highly filled chips and the excess is brushed off.

(4) Another dry blend of vinyl resin is then prepared containing a very low concentration, i.e., 8 to 13 phr., of 2,2,4-trimethylpentane-1,3-diol diisobutyrate. This is spread as a thin second coat of dry blend over the first coat of dry blend.

(5) The two coats of dry blend are then fused by means of a heated press with controlled temperature and pressure so as not to melt the filled chips, which have a higher softening temperature than the unfilled resin.

(6) The resulting fused sheet is then cooled, machined on the underside to the desired thickness, and is cut into squares for use as vinyl floor tiles.

We have developed a modification of this procedure which we have found produces resin surfaces with the best stain resistance. In this modification the dry blend containing the low concentration of TMPD-DI is first spread as a thin layer in the bottom of the mold. It is then covered with the thicker layer of resin dry blend containing the higher concentration of conventional vinyl plasticizer. Finally the filled vinyl chips are laid on top of the second dry blend layer. This combination of layers is then pressed and heated to fuse the clear resin without fusing the filled chips. This method assures that the resin layer containing the low plasticizer concentration remains on the wear surface of the tile. It also gives better coverage of the chips, with fewer chips touching the wearing surface. The overall effect is a significant improvement in the stain resistance of the floor tile.

Although we have described our novel compositions for use as floor tiles, the invention extends to products having other uses. Our procedure of coating stainable resin compositions containing a conventional high concentration of plasticizer with a relatively thin coating of vinyl resin containing a very low concentration of TMPD-DI can be applied to various plastic articles requiring strain resistance, for example, automobile floor mats, door mats, stair treads, table covers, upholstery fabric, wall coverings and the like.

A series of samples have been prepared which provide a comparison of the stain resistance of different vinyl compositions and show the superiority of the compositions of the invention. The following dry blends were prepared in a Henschel mixer by heating to about 170 to 180° F.

| Formulation | 1 | 2 | 3 | 4 | 5 |
|---|---|---|---|---|---|
| Polyvinyl chloride resin | 100 | 100 | 100 | 100 | 100 |
| Barium-cadium stabilizer | 2 | 2 | 2 | 2 | 2 |
| Organic chelator stabilizer | 1 | 1 | 1 | 1 | 1 |
| DOP | 26 | | | | 10 |
| TMPD-DI | | 5 | 10 | 15 | |

Vinyl tile samples were prepared using Formulation 1 as the relatively thick layer. Thus the thick layer was plasticized with the conventional plasticizer, DOP, in conventional concentration. Each sample was provided with a thin surface coating (approximately 5–10 mil) of a resin composition according to one of the Formulations 2 through 5. In preparing the tile samples the dry blend of Formulation 1 was placed in the press and a thin layer of the dry blend containing the low concentration of plasticizer was spread evenly over the top of the first layer and the layers were pressed. For comparison, tiles containing only Formulation 1 as the clear topcoat were also prepared. Tile samples of 5½ x 5½ x 0.070 inches were pressed in a Carver laboratory press at 180° C. The ram pressure was held at 5,000 p.s.i. for 4 minutes and increased to 15,000 p.s.i. for an additional 2 minutes after which the samples were cooled while still under pressure.

Tiles with a thin topcoat of Formulation 2 (5 phr. of TMPD-DI) showed no stain after 24 hours' exposure to the asphalt stain test. However, the thin coating was too brittle and cracked when flexed a few times. Tiles with a thin coating of Formulation 3 (10 phr. of TMPD-DI) also showed no stain after 24 hours' exposure to the asphalt stain test. In addition such tiles were very strong and flexible. The asphalt stain resistance of Formulation 4 (15 phr. of TMPD-DI) was not satisfactory. Stain resistance of Formulation 5 (10 phr. of DOP) was somewhat better, though not as good as Formulation 3, and the serious drawback of this formulation was the tile was very brittle and could be cracked by simply flexing the tile a few times.

As we have shown, 2,2,4-trimethylpentane-1,3-diol diisobutyrate is an excellent nonstaining plasticizer in vinyl floor formulations. For some uses as a plasticizer its volatility has caused trouble, such as fuming and evolution of odors during processing. However, in making the compositions of the present invention, the thin topcoat is preferably applied in a closed system and, in any event, since very low concentrations of TMPD-DI are used, excessive fuming and volatilization are virtually eliminated.

The principal layers of the compositions of our invention are conveniently referred to as a base layer, which normally is a relatively thick layer, and a stain resistant topcoat, which is a relatively thin layer. The particular thicknesses of the layers can vary considerably. In floor tiles the thick layer or base layer may range in thickness from about 25 to 100 mils while the tin layer or topcoat containing TMPD-DI may range from about 2 to 20 mils in thickness. In other articles, e.g., wall coverings, the base layer may be much thinner, e.g., of about the same thickness as the topcoat containing TMPD-DI.

We have described the compositions of the invention as vinyl resin compositions. By this we mean that the resin components of the compositions such as resins of the relatively thin topcoat, the relatively thick coat and the filled vinyl chips are the class of resins that includes various vinyl polymers and copolymers such as poly(vinyl chloride), poly(vinyl acetate), poly(vinyl alcohol), poly(vinylidene chloride) poly(vinyl formal), poly(vinyl butyral) and copolymers of vinyl chloride and vinylidene chloride containing, e.g., 70% or more vinyl chloride, and the like.

We have also indicated that the relatively thick layer and if desired, the filled vinyl chips are plasticized with known vinyl plasticizers in conventional plasticizing amounts, e.g., 25 to 60 phr. Such vinyl plasticizers include materials such as dioctyl phthalate, butyl benzyl phthalate, dioctyl adipate, tricresyl phosphate, dioctyl sebacate, and polymeric vinyl plasticizers such as polypropyleneglycol sebacate and adipate, 2,2,4-trimethylpentane-1,3-diol monoisobutyrate adipate and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A vinyl resin composition comprising (a) a flexible, plasticized base layer of vinyl resin having low resistance to staining and (b) a stain resistant vinyl resin topcoat which contains 8 to 13 parts by weight of 2,2,4-trimethylpentane-1,3-diol diisobutyrate per hundred parts of resin.

2. A vinyl floor tile composition comprising (a) a relatively thick, flexible layer of vinyl chloride polymer containing 25 to 60 parts by weight per hundred parts of resins of plasticizer and (b) a relatively thin coating on said thick layer of a vinyl chloride polymer containing 8 to 13 parts by weight per hundred parts of resins of 2,2,4-trimethylpentane-1,3-diol diisobutyrate.

3. A composition according to claim 2 in which a layer of filled vinyl resin chips is embedded in said thick layer.

References Cited

UNITED STATES PATENTS 3,091,632    5/1963    Hagemeyer et al. ____ 260—476

OTHER REFERENCES

Eastman Chemical Int. A. G. Tech. Data Sheets (1962), citation to the sheets from Rubber Abs., 1964, 42, No. 3, p. 127.

ROBERT F. BURNETT, Primary Examiner

R. J. ROCHE, Assistant Examiner

U.S. Cl. X.R.

161—254; 260—31.6, 410.6, 476; 264—113, 122, 126, 245